United States Patent Office 3,781,210

Patented Dec. 25, 1973

3,781,210

MAGNETIC COATING COMPOSITION

Virgil Allan Lohoff, Santa Clara, Calif., assignor to Memorex Corporation, Santa Clara, Calif.

No Drawing. Filed May 16, 1972, Ser. No. 253,832
Int. Cl. H01l 1/26
U.S. Cl. 252—62.54 2 Claims

ABSTRACT OF THE DISCLOSURE

A fluid, heat curable thermosetting magnetic coating composition in which magnetic particles are dispersed in a solution of five components which upon evaporation of the solvent and heating form a durable resin matrix having the magnetic particles dispersed in it. The five components in solution are an epoxy resin having a molecular weight of about 400–4000 per epoxy group, an amine aldehyde condensation product containing secondary amine groups, a polyamine containing primary amine groups, a polyvinyl acetal resin, and a silanol modified silicone resin.

BACKGROUND OF THE INVENTION

Magnetic coating compositions have been made with both thermoplastic and thermosetting binder systems and many have desirable properties for particular usages. However, a very large proportion of these systems do not meet the rigorous demands made on a binder applied to a magnetic disc and fail for one or more reasons related to magnetic properties of the disc, ability to withstand physical abrasion and repeated head loadings, and/or poor or substandard application properties; that is, desirable coating application properties necessary to properly apply the coating to supporting members.

The property requirements of a magnetic coating are extremely rigorous in the case where the coating is to be used for making the magnetic recording layers for use in "flying head" memory systems such as the IBM 3330 and Memorex 670 disc storage systems. With this type of memory system magnetic layers are supported on a rigid disc, usually made of aluminum, and the disc is rotated rapidly at 3600 r.p.m., for example, while a magnetic head is caused to fly aerodynamically over the disc surface. The extremely high rotational speed plus the high relative speed of head and disc surfaces cause most magnetic coatings to shed oxide from the coating and head crashing with resultant damage to the magnetic head and to the magnetic coating is commonly experienced. Lack of toughness, adhesion to the aluminum or other substrate, impact resistance, long term "head-loading" ability and resistance to commonly used disc cleaning solvents are other shortcomings that most magnetic coatings exhibit.

SUMMARY OF THE INVENTION

In accordance with this invention, a magnetic coating composition is provided which is remarkably well adapted for use in coating memory discs. This coating provides a magnetic recording surface which can be used substantially indefinitely without head crashing, and can withstand long term repeated "head loadings" without loss of magnetic signals. The coating can be applied to the disc support by spin coating, spray coating, roll coating, or knife coating. The coating is especially well adapted to application by the spin coating technique. Additionally, this coating is very resistant to typical solvents such as isopropyl alcohol used for cleaning discs and magnetic heads.

A tough, impact resistant magnetic coating with excellent solvent resistance, excellent application and flow-out properties, as well as good adhesion to aluminum and other type substrates is prepared by coating a support with a solution containing an epoxy resin, an alkylated amine aldehyde condensation product, a primary amine, a polyvinyl acetal resin and a silicone resin which has magnetic particles dispersed in it and then evaporating the solvent and heating the coated support at a temperature and for a time sufficient to cause interaction of the organic components of the coating.

The epoxy resins useful in the invention are those having an average of between one and three epoxy groups per molecule and a molecular weight per epoxy group of between 400–4000 approximately. Preferably the epoxy resin is a product of condensation of epichlorohydrin and bisphenol A having the overall formula:

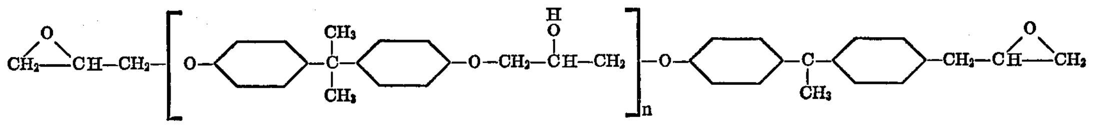

Where $n$ is an integer between 2 and about 10. A preferred resin as described above and used in his invention is sold by Shell Chemical Corporation under the trade name Epon 1001, it has an epoxide equivalent weight (molecular weight divided by the number of epoxy groups per molecule) of 425–550 and melting point of 65–75° C. Other epoxy resins which may be used instead of Epon 10001 are: Shell's Epon 1004 and Epon 1007 (Epon 1007 has an equivalent weight of 1900–2450 and a melt index of 125–135° C.), Dow Chemical's D.E.R. 661 and 664, Ciba Araldite 6071 and 6084, Union Carbide's EER–2011 and EER–2013, General Mills Gen. Epoxy 525 and Gen. Epoxy 925, Jones-Dabney Epirez #520 and #530–C and Reichhold's Epotuf 6301 and 6304.

The amine aldehyde condensation product is a polyamine having a high concentration of secondary amine groups and it is preferred that it have more than two secondary amino groups per molecule and more preferably approximately three secondary amine groups per molecule. A preferred type is made and sold by Monsanto Chemical Company under the trade name Resimene 740 and is an alkylated melamine-formaldehyde condensation product sold in a 90% solids solution in isopropanol. These condensation products have the following chemical structure:

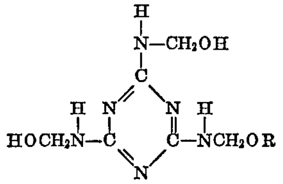

Where R may be an alkyl group of from one to four carbon atoms. These condensation products usually contain appreciable concentrations of dimers and trimers of the aforementioned structure. When R is butyl, the molecular weight of this monomer is 272 and its equivalent weight is 91. Other aldehyde-amine condensation products which may be used are American Cyanamid Cymel 350, butylated formaldehyde melamine condensation products such as Monsanto UF-91, American Cyanamid Bettle 227-8, and Reichhold Beckamine P-138-60.

The polyvinyl acetals used in this coating composition are prepared from the reaction of aldehydes and polyvinyl alcohols. Polyvinyl alcohols are synthetic resins of high molecular weight that contain varying concentrations of hydroxyl and acetate groups produced in the usual manner by hydrolyzing polyvinyl acetate. The conditions of the acetal reaction and the concentration of the particular aldehyde and polyvinyl alcohol used are closely controlled to form polymers having a predetermined proportion of hydroxyl groups, acetate groups, and acetal groups. The final product may be presented in a stylized structure as follows:

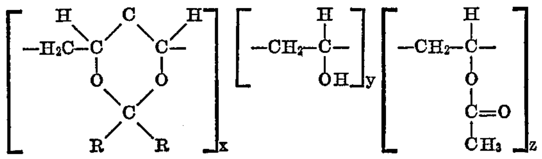

The values of $x$, $y$ and $z$ are such that the mol percents of acetal, alcohol and acetate in the polymer are in the respective ranges 75-85 mol percent, 19-25 mol percent and 0.5-3. mol percent.

The preferred polyvinyl acetal resins are polyvinylbutyral resins which are manufactured by Monsanto Chemical Co. under the trade name Butvar resins. The molecular weight of these resins can be varied considerably: for instance, Butvar B-79 is from 34,000 to 38,000 in molecular weight (weight average) while B-27A type Butvar is from 180,000 to 270,000 molecular weight. Substantially all the Butvar type resins may be used for this coating composition, however, Butvar B-74 type with a molecular weight of 100,000 to 150,000 is the preferred type.

The silicone resins which may be employed in the coating composition have the generalized structure illustrated by the formula—

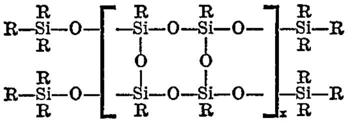

in which R may be a lower alkyl radical or a phenyl radical and $x$ is from 1 to 20. The silicones may also be represented by the formula $$\left[RnSiO_{\frac{4-n}{2}}\right]_m$$

in which R is lower alkyl and $n$ is 1 or 2 and $m$ is at least 8.

A small proportion of a lower alkyl or phenyl silanol is incorporated in the silicon to provide functional activity. A preferred silicone is General Electric Company's SR-82. This resin is a methyl-phenyl silicone and may be described as containing $CH_3SiO_{3/2}$, $C_6H_5SiO_{3/2}$, $$(CH_3)_2SiO$$

and $(C_6H_5)_2SiO$ in proportions such that the ratio of the methyl plus phenyl groups to the silicone atoms in the resin is in the range from slightly above 1 to 2; it has incorporated in it from about 4 to about 8 percent by weight of a lower alkyl or phenyl silanol. The minor silanol component provides the resin with reactive hydroxyl groups which permit it to become chemically bonded to the other organic components of the coating composition when heated.

The polyamine used has a minimum of one primary amine group per molecule, and the presence of a primary amine has been found to be essential in obtaining a satisfactory coating. The preferred polyamine is N-aminoethylpiperazine which has a molecular weight of 130 and an equivalent weight of 43.3. Other amines can be employed: the ethylene polyamines, such as diethylenetriamine, ethylenediamine, and the like.

The solvents employed must be capable of dissolving the above described materials, be inert to them at temperatures up to the solvent boiling point and have boiling points below about 200° C. The Cellosolves and the Carbitols are effective solvents.

The proportions of the several organic components in the coating composition are such that for each epoxy equivalent weight of epoxy resin (the epoxy equivalent weight is the molecular weight of the resin divided by the number of epoxy groups per resin molecule, in general the epoxy equivalent weight is one-half the molecular weight) contained the composition contains from 30 to 60 parts by weight of amine aldehyde condensation product, from 80 to 180 parts by weight of polyvinyl acetal resin plus silanol modified silicone resin having a weight ratio of acetal resin to silicone resin in the range of 0.5:1 to 2:1, from 5 to 15 parts by weight of polyamine and sufficient solvent to give the total composition a viscosity in the range 150 to 450 cps. at 24° C. as measured by a Brookfield viscometer using a #2 spindle at 20 r.p.m., usually 2000 to 4000 parts by weight.

The polyvinyl acetal and silicone components of the composition co-act to provide excellent flow control during application of the coating to the support. With these materials present the coating is free pinholing, exhibits no "orange peel" surface and is free of coating lines and streaks. The coating is remarkably smooth before polishing so that the polishing step is simplified. Typically, the surface roughness for the unpolished coating is no more than 6 to 8 microinches (center-line-average) and is very readily polished to a 2 microinch (center-line-average) smoothness.

To obtain the desired flow control, both the acetal and the silicone are used. Silicone alone will not in any quantity provide acceptable flow control. Acetal alone in larger amounts will provide acceptable flow control but only if a very high boiling solvent is used. Such solvents create problems in the curing step due to viscosity reduction of the coating before the solvent can be evaporated, slow evaporation and pick-up of debris before becoming tack-free.

Magnetic oxide particles are preferably put into the coating composition at between 60 and 400 parts of magnetic oxide by weight per 100 parts by weight of binder, and between about 100 and 400 parts of volatile solvents per 100 parts of combined oxide and binder mixtures. Various types of magnetic oxide particles can be used; the magnetic particle employed in the illustrations to follow is one manufactured by Charles Pfizer Company and is sold as MO-2530. This magnetic particle has a specific magnetic moment of 75 emu/gm. (minimum) and a coercive force ($H_c$) of from 285-305 oersteds.

A small amount of finely divided abrasive material such as flint, garnet, silicon carbide or alumina as described in U.S. Pat. 3,622,386 is desirably incorporated in the coating composition. The amount of abrasive material is usually in the range of 1-10% by weight of the total coating composition excluding solvent.

DETAILED DESCRIPTION

Examples as set forth to better illustrate the preparation and application of the magnetic recording media in accordance with this invention. Example I represents the general process and Examples II and III represent similarly processed formulas which have excellent physical properties and permit heads to fly continually without crashing.

EXAMPLE I

The proportions of the several components were as tabulated below:

| Component | Parts by weight | Solids, wt. percent total solids |
|---|---|---|
| Magnetic oxide (Pfizer MO-2530) | 47.2 | 47.2 |
| 60% Epon 1001 in Cellosolve | 57.4 | 34.4 |
| 90% Resimene 740 in isopropanol | 3.4 | 3.1 |
| 10% Butvar B-74 in Cellosolve | 46.0 | 4.6 |
| 60% SR-82 in toluene | 7.7 | 4.6 |
| Abrasive particles (alumina) | 5.5 | 5.5 |
| 100% N-aminoethylpiperazine | 0.6 | 0.6 |
| Cellosolve | 152.0 | |
| Total | 319.8 | 100.0 |

The magnetic dispersion was prepared according to the following procedure: 47.2 parts of magnetic oxide were added to 52.2 parts of Cellosolve and this mixture was stirred for 2–4 hours. Then 38.2 parts of 60% Epon 1001 were added and this mixture was milled until free of agglomerates. 19.2 parts of Epon 1001 (60%), 46.0 parts of 10% Butvar B–14, 7.7 parts of 60% SR–82, 3.4 parts of 90% Resimene 740, and 5.5 parts of abrasive particle were then stirred into the milled mixture. Finally, 0.6 parts of N-aminoethylpiperazine plus 99.8 parts of Cellosolve were added to adjust the final viscosity of the total mixture to approximately 300 cps. at 24° C. as measured by Brookfield viscometer using #2 spindle at 20 r.p.m.

The coating was then applied to an aluminum disc by spin coating technique and the coated disc was baked for approximately 3 hours at 220° C. Upon cooling the disc was polished to under a 2 micro-inch finish as measured by a "Clevite" surface roughness analyzer. A disc pack was assembled consisting of 10 discs made as above described (1 servo side and 19 data sides) plus 2 cover discs. These were used in the IBM 3330 Disc Drive and in the MRX 670 Disc Drives. These drives were connected to controller units which in turn are utilized by the IBM 370 Computer System.

Discs made with the formulas shown in Examples I to III have been tested in a head loading tester using a MRX 670 ceramic head and have successfully passed through 50,000 cycles with no apparent sign of deterioration.

EXAMPLE II

| Component | Parts by weight | Solids, wt. percent total solids |
|---|---|---|
| Magnetic oxide | 47.2 | 47.2 |
| 60% Epon 1001 in Cellosolve | 57.4 | 34.4 |
| 90% Resimene 740 in isopropanol | 3.4 | 3.1 |
| 10% Butvar B-74 in Cellosolve | 46.0 | 4.6 |
| 60% DC-804 silicone resin in toluene | 7.7 | 4.6 |
| Abrasive particle | 5.5 | 5.5 |
| 100% N-aminoethylpiperazine | 0.6 | 0.6 |
| Cellosolve | 152.0 | |
| Toral | 319.8 | 100.0 |

EXAMPLE III

| Component | Parts by weight | Solids, wt. percent total solids |
|---|---|---|
| Magnetic oxide | 47.2 | 47.2 |
| 60% Epon 1001 in Cellosolve | 57.4 | 34.4 |
| 90% Resimene 740 in isopropanol | 3.4 | 3.1 |
| 10% Butvar B-72A in Cellosolve | 46.0 | 4.6 |
| 60% SR-82 silicone resin in toluene | 7.7 | 4.6 |
| Abrasive particle | 5.5 | 5.5 |
| 100% N-aminoethylpiperazine | 0.6 | 06. |
| Cellosolve | 152.0 | |
| Total | 319.8 | 100.0 |

I claim:

1. A magnetic coating composition consisting essentially of magnetic particles dispersed in an intimate mixture of:
   - (a) an epoxy resin having an average of between one and three epoxy groups per molecule and having an epoxy equivalent weight in the range 400 to 4000,
   - (b) an amine-aldehyde condensation product which is a polyamine having a high concentration of secondary amine groups and has more than two secondary amino groups per molecule,
   - (c) a polyvinyl acetal resin having a molecular weight in the range 34,000 to 270,000,
   - (d) a silanol modified silicone resin having a silanol content in the range 4–8 percent by weight,
   - (e) a polyamine having at least one primary amine group per molecule,
   - (f) a volatile organic solvent which is not reactive with any of (a), (b), (c), (d) and (e) at its boiling point, the proportions of the components of the mixture being such that for each epoxy equivalent weight of epoxy resin there is present from 30 to 60 parts by weight of amine aldehyde condensation product, from 80 to 180 parts by weight of polyvinyl acetal resin plus silicone resin with the ratio of polyvinylacetal to silicone being in the range 0.5:1 to 2:1, from 5 to 15 parts by weight polyamine and from 2000 and 4000 parts by weight of solvent.

2. A magnetic coating composition comprising magnetic particles dispersed in an intimate mixture of:
   - (a) an epoxy having an average of between one and three epoxy groups per molecule and having an epoxy equivalent weight in the range 400 to 4000,
   - (b) an alkylated melamine-formaldehyde condensation product,
   - (c) a polyvinyl acetal resin having a molecular weight in the range 34,000 to 270,000,
   - (d) a silicone resin $$(RnSiO_{4-n/2})_m$$

in which R is methyl and phenyl and $n$ is 1 or 2 and $m$ is at least 8, the resin having incorporated in it from 4 to 8% by weight of a lower alkyl or phenyl silanol,
   - (e) an amine selected from the group consisting of ethylene diamine, diethylene triamine and N-aminoethyl piperazine, and
   - (f) an organic solvent boiling below about 200° C. which is unreactive with (a), (b), (c), (d) and (e) at its boiling point, the proportions of the components of the mixture being such that for each epoxy equivalent weight of epoxy resin there is present from 30 to 60 parts by weight of the melamine-formaldehyde condensation product, from 80 to 180 parts by weight of polyvinyl acetal plus silicone resin with the ratio of polyvinylacetal to silicone being in the range 0.5:1 to 2:1, from 5 to 15 parts by weight of amine and a quantity of solvent sufficient to give the total composition a viscosity in the range 150–450 cps. at 24° C.

References Cited

UNITED STATES PATENTS

| | | | |
|---|---|---|---|
| 3,411,944 | 11/1968 | Higashi | 252—62.54 |
| 3,474,073 | 10/1969 | Higashi | 252—62.54 |
| 3,560,388 | 2/1971 | Higashi | 252—62.54 |

DANIEL E. WYMAN, Primary Examiner

A. P. DEMERS, Assistant Examiner

U.S. Cl. X.R.

117—235; 260—37 SB, 37 EP, 37 N